(12) United States Patent
Ion et al.

(10) Patent No.: US 10,949,679 B2
(45) Date of Patent: Mar. 16, 2021

(54) NIGHTTIME SENSING (71) Applicant: Apple Inc., Cupertino, CA (US)

(72) Inventors: Lucian Ion, Mountain View, CA (US);
Daniel E. Potter, San Jose, CA (US);
Evan C. Cull, Sunnyvale, CA (US);
Xiaofeng Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 271 days.

(21) Appl. No.: 16/126,509

(22) Filed: Sep. 10, 2018

(65) Prior Publication Data

US 2019/0095721 A1 Mar. 28, 2019

Related U.S. Application Data (60) Provisional application No. 62/564,654, filed on Sep. 28, 2017.

(51) Int. Cl.
*G06K 9/00* (2006.01)
*G06K 9/20* (2006.01)
(Continued)

(52) U.S. Cl.
CPC ....... *G06K 9/00791* (2013.01); *G05D 1/0214* (2013.01); *G05D 1/0246* (2013.01);
(Continued)

(58) Field of Classification Search
CPC .............. G05D 1/0214; G05D 1/0246; G05D 2201/0213; G06K 9/00791; G06K 9/00805; G06K 9/2018; G06K 9/2027; G06K 9/3241; G06K 9/6267; H04N 5/2258; H04N 5/23218; H04N 5/2354; H04N 5/332
See application file for complete search history.

(56) References Cited

U.S. PATENT DOCUMENTS 10,397,497 B1 * 8/2019 Graves .................. G01S 17/931
10,656,275 B1 * 5/2020 Bills ........................ G01S 17/86
(Continued)

FOREIGN PATENT DOCUMENTS

WO 2013052383 A1 4/2013

OTHER PUBLICATIONS

Invitation to Pay Additional Fees and, Where Applicable, Protest Fee, as issued by the International Searching Authority in co-pending International Application No. PCT/US2018/050226 dated Nov. 27, 2018 (10 pp).

(Continued)

*Primary Examiner* — Bobbak Safaipour
(74) *Attorney, Agent, or Firm* — Young Basile Hanlon & MacFarlane, P.C.

(57) ABSTRACT

Systems and methods for night vision combining sensor image types. Some implementations may include obtaining a long wave infrared image from a long wave infrared sensor; detecting an object in the long wave infrared image; identifying a region of interest associated with the object; adjusting a control parameter of a near infrared sensor based on data associated with the region of interest; obtaining a near infrared image captured using the adjusted control parameter of the near infrared sensor; and determining a classification of the object based on data of the near infrared image associated with the region of interest.

20 Claims, 6 Drawing Sheets (51) Int. Cl.
*G06K 9/32* (2006.01)
*G06K 9/62* (2006.01)
*G05D 1/02* (2020.01)
*H04N 5/225* (2006.01)
*H04N 5/33* (2006.01)
*H04N 5/235* (2006.01)
*H04N 5/232* (2006.01)

(52) U.S. Cl.
CPC ....... *G06K 9/00805* (2013.01); *G06K 9/2018* (2013.01); *G06K 9/2027* (2013.01); *G06K 9/3241* (2013.01); *G06K 9/6267* (2013.01); *H04N 5/2258* (2013.01); *H04N 5/2354* (2013.01); *H04N 5/23218* (2018.08); *H04N 5/332* (2013.01); *G05D 2201/0213* (2013.01)

(56) References Cited

U.S. PATENT DOCUMENTS

| | | | | |
|---|---|---|---|---|
| 2010/0100275 | A1* | 4/2010 | Mian | B61L 1/20 |
| | | | | 701/31.4 |
| 2010/0290703 | A1* | 11/2010 | Sim | G06T 5/10 |
| | | | | 382/172 |
| 2011/0063446 | A1 | 3/2011 | McMordie et al. | |
| 2012/0147194 | A1* | 6/2012 | Wang | G06K 9/00838 |
| | | | | 348/164 |
| 2012/0262577 | A1* | 10/2012 | Wang | G06T 7/11 |
| | | | | 348/148 |
| 2014/0300897 | A1* | 10/2014 | Treado | G01J 3/0224 |
| | | | | 356/364 |
| 2016/0202122 | A1* | 7/2016 | Zhang | G01J 3/2823 |
| | | | | 356/51 |
| 2016/0284075 | A1* | 9/2016 | Phan | G06K 9/00664 |
| 2016/0350601 | A1* | 12/2016 | Grauer | G06T 11/60 |
| 2017/0270375 | A1* | 9/2017 | Grauer | G06K 9/6293 |
| 2018/0239055 | A1* | 8/2018 | Widmer | B60L 53/124 |
| 2018/0284274 | A1* | 10/2018 | LaChapelle | G01S 7/483 |
| 2018/0302564 | A1* | 10/2018 | Liu | H04N 5/2258 |
| 2019/0072976 | A1* | 3/2019 | Bell | C09D 5/22 |
| 2019/0217864 | A1* | 7/2019 | Kusukame | G05D 1/0088 |

OTHER PUBLICATIONS

Chen, Yen-Lin, et. al., "A Vision-Based Driver Nighttime Assistance and Surveillance System Based on Intelligent Image Sensing Techniques and a Heterogamous Dual-Core Embedded System Architecture", Sensors, Feb. 23, 2012, http://citeseerx.ist.psu.edu/viewdoc/download?doi=10.1.1.367.9013&rep=rep1&type=pdf, (27 pp).

Zhou, S., et. al., "A Night Time Application for a Real-Time Vehicle Detection Algorithm Based on Computer Vision", Research Journal of Applied Sciences, Engineering and Technology 5(10): 3037-3043, Mar. 25, 2013 (7 pp).

Gonzalez, A., et. al., "Pedestrian Detection at Day/Night Time With Visible and FIR Cameras: A Comparison", MDPI, Sensors, https://www.ncbi.nlm.nih.gov/pmc/articles/PMC4934246/, Jun. 4, 2016, (11 pp).

Nazib, A., et. al., "Object Detection and Tracking in Night Time Video Surveillance", 10th International Conference on Ubiquitous Robots and Ambient Intelligence, Oct. 2013, https://www.researchgate.net/publication/260024237/download, (4 pp).

Philipsen, M., et. al., "Day and Night-Time Drive Analysis Using Stereo Vision for Naturalistic Driving Studies", IEEE Intelligent Vehicles Symposium, Jun. 2015, (6 pp).

* cited by examiner

NIGHTTIME SENSING

CROSS-REFERENCE TO RELATED APPLICATIONS

This application claims the benefit of U.S. Provisional Application No. 62/564,654, filed on Sep. 28, 2017, the content of which is hereby incorporated by reference in its entirety for all purposes.

TECHNICAL FIELD

This disclosure relates to multi-modal sensing for nighttime autonomous object detection and recognition.

BACKGROUND

Some automated systems gather process large quantities of sensor data to identify objects in the surrounding environment. The processing of sensor data is often subject to a real-time constraint to facilitate navigation and/or robust control of the automated system.

SUMMARY

Disclosed herein are implementations of multi-modal sensing for nighttime autonomous object detection and recognition.

In a first aspect, the subject matter described in this specification can be embodied in systems that include a body; actuators operable to cause motion of the body; a long wave infrared sensor; and a near infrared sensor. The systems include a processing apparatus configured to obtain a long wave infrared image from the long wave infrared sensor, detect an object in the long wave infrared image, identify a region of interest associated with the object, adjust a control parameter of the near infrared sensor based on data associated with the region of interest, obtain a near infrared image captured using the adjusted control parameter of the near infrared sensor, determine a classification of the object based on data of the near infrared image associated with the region of interest, determine a motion plan based on the classification of the object, and output commands to the actuators to maneuver the system.

In a second aspect, the subject matter described in this specification can be embodied in systems that include a long wave infrared sensor; a near infrared sensor; a data processing apparatus; and a data storage device storing instructions executable by the data processing apparatus that upon execution by the data processing apparatus cause the data processing apparatus to perform operations including: obtaining a long wave infrared image from the long wave infrared sensor detect an object in the long wave infrared image, identifying a region of interest associated with the object, adjusting a control parameter of the near infrared sensor based on data associated with the region of interest, obtaining a near infrared image captured using the adjusted control parameter of the near infrared sensor, and determining a classification of the object based on data of the near infrared image associated with the region of interest.

In a third aspect, the subject matter described in this specification can be embodied in methods that include obtaining a long wave infrared image from a long wave infrared sensor; detecting an object in the long wave infrared image; identifying a region of interest associated with the object; adjusting a control parameter of a near infrared sensor based on data associated with the region of interest; obtaining a near infrared image captured using the adjusted control parameter of the near infrared sensor; and determining a classification of the object based on data of the near infrared image associated with the region of interest.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Nighttime or low-light environments present challenges for automated vehicle control systems. For example, the illumination level provided by headlights on a vehicle at night may be limited by laws or regulations, which may in turn limit the effective range of a visible spectrum sensor (e.g., a camera) used for detecting objects in or near the path of the vehicle. Having a limited effective range (e.g., about 60 meters) for detecting and or classifying objects can reduce safety and/or reduce the speed at which the vehicle can travel safely.

A combination of multiple complimentary image sensing technologies may be employed to address the challenges of nighttime or low-light environment object detection and classification. For example, there may be looser or no restrictions on the illumination level of a near infrared illuminator mounted on a vehicle. A near infrared sensor with a near infrared illuminator can be configured to capture high resolution image information about objects in or near a path of the vehicle out to a significantly longer range (e.g., 200 meters) from the vehicle. This may enable earlier detection and classification of objects as the vehicle moves and improve safety and/or maximum speed. Near infrared illuminators may project near infrared light in a relatively narrow field of view (e.g., a 30-degree cone).

Although their range may be relatively limited, visible spectrum sensors can provide high resolution image data in multiple color channels (e.g., red, green, and blue). Visible spectrum sensors also may provide a wider field of view (e.g., a 120-degree field of view) of the path in front of a vehicle.

Long wave infrared sensors capture naturally occurring thermal radiation from objects in the environment around a vehicle and therefore do not rely on an illuminator. The effective range of a long wave infrared sensor may be limited by the sensor resolution and the resolution requirements for object detection and/or classification. A long wave infrared sensor, which may include an array of component sensors, may provide a wide field of view around the vehicle (e.g., a 180-degree field of view). Long wave infrared sensors may provide images of objects in the environment that are of relatively low resolution.

In some implementations, objects detected based on low resolution image data from a long wave infrared sensor are classified by adjusting control parameters for other sensing modalities and/or image processing resources to focus computer vision resources of the vehicle on a region of interest associated with the detected objects. For example, an integration time, an aperture size, a filter, or a gain for a sensor (e.g., a near infrared sensor or a visible spectrum sensor) may be adjusted to enhance a portion of a captured image associated with a region of interest. For example, a power level or a field of view for an illuminator (e.g., a near infrared illuminator or a visible spectrum illuminator) may be adjusted to enhance a portion of a captured image associated with a region of interest. For example, a computational control parameter (e.g., a resolution used for image processing or a count of image processing passes) may be adjusted and applied to an image portion associated with a region of interest.

The techniques described herein may provide improvements over prior computer vision systems for automated vehicles. Some implementations may increase the effective range at which objects in or near the path of a vehicle may be detected and classified. Some implementations may more accurately classify objects in a low-light environment. Safety of an automated vehicle control system may be improved and/or the maximum safe speed in low-light environments may be increased.

Figure 1:
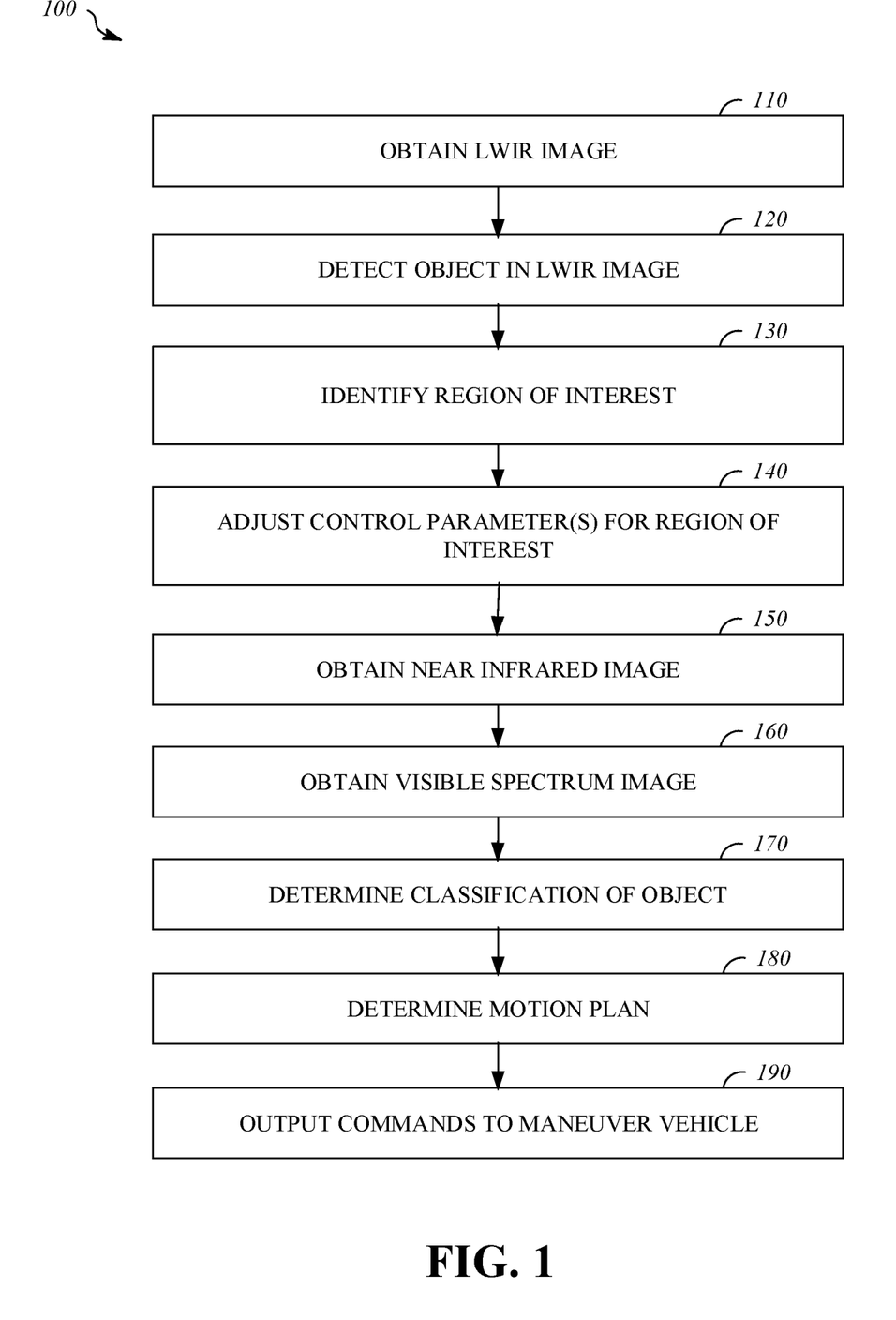
FIG. 1 is a flowchart of an example of a process for multi-modal sensing for nighttime autonomous object detection and recognition.

FIG. 1 is a flowchart of an example of a process 100 for multi-modal sensing for nighttime autonomous object detection and recognition. The process 100 includes obtaining 110 a long wave infrared image from a long wave infrared sensor; detecting 120 an object in the long wave infrared image; identifying 130 a region of interest associated with the object; adjusting 140 one or more control parameters based on data associated with the region of interest; obtaining 150 a near infrared image captured using the adjusted control parameter(s) for a near infrared sensor; obtaining 160 a visible spectrum image captured using the adjusted control parameter(s) for a visible spectrum sensor; determining 170 a classification of the object based on data of the near infrared image and/or the visible spectrum image associated with the region of interest; determining 180 a motion plan based on the classification of the object; and outputting 190 commands to actuators to maneuver a vehicle. For example, the process 100 may be implemented by the automated controller 450 of FIG. 4. For example, the process 100 may be implemented by the vehicle controller 500 of FIG. 5. For example, the process 100 may be implemented by the computing device 600 of FIG. 6.

The process 100 includes obtaining 110 a long wave infrared image from a long wave infrared sensor. For example, the long wave infrared sensor may detect electromagnetic radiation in a spectral range corresponding to thermal radiation (e.g., wavelengths of 8 micrometers to 15 micrometers). The long wave infrared image may include a wide field of view (e.g., 180 degrees). The long wave infrared image may offer low resolution information about objects in space out to a long range from the sensor. For example, the long wave infrared image may be obtained 110 via the long wave infrared sensor 436 of FIG. 4. For example, the long wave infrared image may be obtained 110 via the sensor interface 530 of FIG. 5. For example, the long wave infrared image may be obtained 110 via the wireless interface 630 of FIG. 6.

The process 100 includes detecting 120 an object in the long wave infrared image. For example, one or more objects may be detected 120 by identifying clusters of pixels reflecting thermal radiation from an object (e.g., a person, an animal, or a vehicle) that is greater than its surroundings in the space depicted in the long wave infrared image. For example, one or more objects may be detected 120 in the long wave infrared image using an image segmentation routine (e.g., implementing Felzenszwalb segmentation) to identify clusters of pixels in the long wave infrared image associated with an object appearing within the field of view of the long wave infrared image. For example, an object may be detected 120 using the object detector 460 of FIG. 4.

The process 100 includes identifying 130 a region of interest associated with the object. The region of interest may be specified in coordinate system common to multiple sensors (e.g., a vehicle coordinate system). For example, a specification of the region of interest may include a view angle. The region of interest may correspond to image portions (e.g., blocks of pixels) in images from multiple respective image sensors. The region of interest may be mapped to portions of images from multiple sensors using a bundle adjustment algorithm (e.g., using the SLAM (Simultaneous Localization and Mapping) algorithm). The region of interest may be identified 130 based on the locations of pixels of the long wave infrared image in a cluster associated with the object. For example, a view angle of the region of interest may be directed at a center on the cluster of pixels. A size of the region of interest may be determined based on a size of a cluster of pixels associated with the object. The identified 130 region of interest may correspond to image portions of images from additional sensors (e.g., a near infrared image and/or a visible spectrum image), which may be analyzed to determine additional information about the detected 120 object.

The process 100 includes adjusting 140 one or more control parameters for the region of interest to enhance the capture and/or analysis of data from additional sensors in the region of interest. For example, a control parameter of the near infrared sensor may be adjusted 140 based on data associated with the region of interest. For example, an integration time or exposure time for pixels in the region of interest may be adjusted 140 to enhance contrast of a near infrared image within the region of interest. For example, an aperture size for the near infrared sensor may be adjusted 140 to enhance a near infrared image within the region of interest. For example, a filter for the near infrared sensor may be adjusted 140 (e.g., selected) to enhance a near infrared image within the region of interest by selecting an appropriate spectral range for the object (e.g., based on an initial classification of the object). For example, a gain (e.g., an electronic amplifier gain) for the near infrared sensor may be adjusted 140 to enhance a near infrared image within the region of interest. For example, a control parameter (e.g., an integration time, an aperture size, a filter selection, and/or an amplifier gain) of a visible spectrum sensor may be adjusted 140 based on data associated with the region of interest. For example, a control parameter (e.g., a power level and/or a field of view) of a visible spectrum illuminator may be adjusted 140 based on data associated with the region of interest. For example, a control parameter (e.g., a power level and/or a field of view) of a near infrared illuminator may be adjusted 140 based on data associated with the region of interest. For example, a computational control parameter (e.g., a resolution for signal processing pass or a count of signal processing passes) may be adjusted 140 based on data associated with the region of interest. In some implementations, control parameters for multiple sensors and image processing routines are adjusted 140 to provide more information about the region of interest. For example, the process 200 of FIG. 2 may be implemented to adjust 140 control parameters for the region of interest.

The process 100 includes obtaining 150 a near infrared image captured using an adjusted 140 control parameter of the near infrared sensor. For example, the near infrared sensor may detect electromagnetic radiation in a spectral range just below the visible range (e.g., wavelengths of 0.75 micrometers to 1.4 micrometers). A near infrared illuminator may be used to generate light in this spectral range that is reflected off objects in the space and detected by the near infrared sensor. The near infrared image may be captured using an adjusted 140 near infrared illuminator control parameter. The adjusted 140 control parameter may include, for example, an integration time, a filter selection, an aperture size selection, and/or a gain. In some implementations, the adjusted 140 control parameter(s) may include control parameter(s) (e.g., a power level and/or a field of view) for a near infrared illuminator. The near infrared image may include a narrow field of view (e.g., 30 degrees). The near infrared image may have a higher resolution than the long wave infrared image and include information about objects in space out to a long range (e.g., 200 meters) from the near infrared sensor. In some implementations, the near infrared illuminator includes an array of illuminators pointed in different directions from a vehicle (e.g., three illuminator components with respective 30 degree fields of view that collectively span a 90 degree field of view) and near infrared illuminator components pointed off the path of the vehicle may have their power level modulated to low power or off (e.g., to save power) when no objects are detected within its respective field of view using a long wave infrared sensor and modulated to on or a high power level when an object is detected within its respective field of view using a long wave infrared sensor. For example, the near infrared image may be obtained 150 via the near infrared sensor 434 of FIG. 4. For example, the near infrared image may be obtained 150 via the sensor interface 530 of FIG. 5. For example, the near infrared image may be obtained 150 via the wireless interface 630 of FIG. 6.

The process 100 includes obtaining 160 a visible spectrum image from a visible spectrum sensor that is captured using the adjusted control parameter of the visible spectrum sensor. For example, the visible spectrum sensor may detect electromagnetic radiation in a spectral range that is visible to humans (e.g., wavelengths of 400 nanometers to 700 nanometers). The visible spectrum sensor may capture light in multiple spectral subranges corresponding to different colors (e.g., red, green, and blue) and the visible spectrum image may include multiple color channels (e.g., RGB or YCrCb). A visible spectrum illuminator (e.g., a headlight on a vehicle) may be used to generate light in this spectral range that is reflected off objects in the space and detected by the visible spectrum sensor. The visible spectrum image may be captured using an adjusted 140 visible spectrum illuminator control parameter. The adjusted 140 control parameter for the visible spectrum sensor may include, for example, an integration time, a filter selection, an aperture size selection, and/or a gain. In some implementations, the adjusted 140 control parameter(s) may include control parameter(s) (e.g., a power level and/or a field of view) for a visible spectrum illuminator. The visible spectrum image may include a field of view (e.g., 120 degrees or 180 degrees). The visible spectrum image may have a higher resolution than the long wave infrared image and include information about objects in the space out to a short range (e.g., 60 meters) from the visible spectrum sensor. For example, the visible spectrum image may be obtained 160 via the visible spectrum sensor 432 of FIG. 4. For example, the visible spectrum image may be obtained 160 via the sensor interface 530 of FIG. 5. For example, the visible spectrum image may be obtained 160 via the wireless interface 630 of FIG. 6.

The process 100 includes determining 170 a classification (e.g., as a person, an animal, a vehicle, a barrier, a building, a traffic sign, static, dynamic, etc.) of the object based on data from one or more sensors associated with the region of interest. For example, a classification of the object may be determined 170 based on data of the near infrared image associated with the region of interest. For example, the classification of the object may be determined 170 based on data of the visible spectrum image associated with the region of interest. Image data (e.g., from the visible spectrum image, from the near infrared image, and/or from the long wave infrared image) for the region of interest may pre-processed and/or input to a machine learning unit (e.g., including a convolutional neural network) that outputs a classification of the object appearing in the region of interest. In some implementations, a classification of the object is determined using an adjusted 140 computational control parameter (e.g., a resolution, a stride, or a count of pre-processing passes). For example, the process 300 of FIG. 3A may be implemented to determine 170 a classification of the object. For example, the object classifier 470 may be used to determine 170 a classification of the object. In some implementations (not explicitly shown in FIG. 1), the control parameter(s) used to obtain and process sensor data for the region of interest may be iteratively adjusted 140 to determine 170 a classification of the object appearing in the region of interest.

The process 100 includes determining 180 a motion plan based on the classification of the object. For example, an object classification may be used by an object tracker to generate object tracking data including projected paths for dynamic objects, which may be used to determine 180 a motion plan for collision avoidance or passing. For example, the motion plan may be determined 180 by the automated controller 450 of FIG. 4.

The process 100 includes outputting 190 commands to actuators to maneuver a vehicle. The commands may be based on the motion plan. For example, commands may be output 190 to a power source and transmission system (e.g., the power source and transmission system 422), a steering system (e.g., the steering system 424), and/or a braking system (e.g., the braking system 426). For example, the commands may be output 190 by the automated controller 450, the vehicle controller 500, or the computing device 600. For example, the commands may be output 190 via the controller interface 540, or the wireless interface 630. For example, maneuvering the vehicle may include accelerating, turning, and/or stopping.

Figure 2:
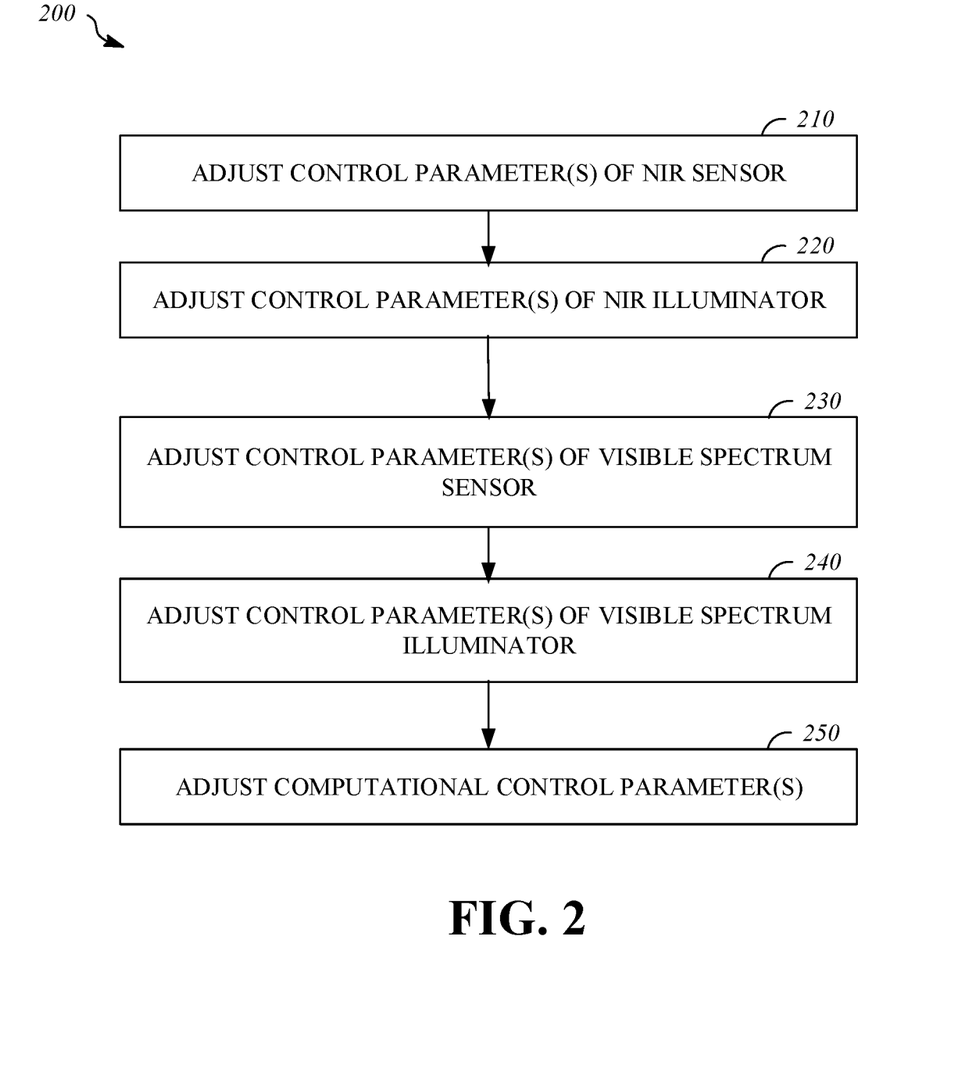
FIG. 2 is a flowchart of an example of a process for adjusting control parameters for a region of interest.

FIG. 2 is a flowchart of an example of a process 200 for adjusting control parameters for a region of interest. The process 200 includes adjusting 210 one or more control parameters of a near infrared sensor; adjusting 220 one or more control parameters of a near infrared illuminator; adjusting 230 one or more control parameters of a visible spectrum sensor; adjusting 240 one or more control parameters of a visible spectrum illuminator; and adjusting 250 one or more control parameters of a computational routine for processing image data for the region of interest. For example, the process 200 may be implemented by the automated controller 450 of FIG. 4. For example, the process 200 may be implemented by the vehicle controller 500 of FIG. 5. For example, the process 200 may be implemented by the computing device 600 of FIG. 6.

The process 200 includes adjusting 210 one or more control parameters of a near infrared sensor. For example, an adjusted 210 control parameter of the near infrared sensor may be an integration time. The integration time may be a duration of time during which an image sensing element of the near infrared sensor collects photons prior to sampling for an image capture. For example, an adjusted 210 control parameter of the near infrared sensor may be an aperture size. An aperture size may be adjusted 210 mechanically by expanding or contracting an aperture in cover of the image sensor or by swapping in a cover with a different aperture size. For example, an adjusted 210 control parameter of the near infrared sensor may be a filter selection. A filter selection may cause an optical filter (e.g., made of glass or plastic) to be mechanically moved into or out of position over a sensing element of the near infrared sensor. For example, an adjusted 210 control parameter of the near infrared sensor may be an amplification gain (e.g., an electronic amplifier gain).

The process 200 includes adjusting 220 a near infrared illuminator control parameter based on data associated with the region of interest. For example, an adjusted 220 near infrared illuminator control parameter may be a brightness. The brightness of the illuminator may be proportional to power level and/or an illumination level. For example, an adjusted 220 near infrared illuminator control parameter is field of illumination. The field of illumination may be adjusted 220 by changing a lens covering the illuminator.

The process 200 includes adjusting 230 a control parameter of the visible spectrum sensor based on data associated with the region of interest. For example, an adjusted 230 control parameter of the visible spectrum sensor may be an integration time. The integration time may be a duration of time during which an image sensing element of the visible spectrum sensor collects photons prior to sampling for an image capture. For example, an adjusted 230 control parameter of the visible spectrum sensor may be an aperture size. An aperture size may be adjusted 230 mechanically by expanding or contracting an aperture in cover of the image sensor or by swapping in a cover with a different aperture size. For example, an adjusted 230 control parameter of the visible spectrum sensor may be a filter selection. A filter selection may cause an optical filter (e.g., made of glass or plastic) to be mechanically moved into or out of position over a sensing element of the visible spectrum sensor. For example, an adjusted 230 control parameter of the visible spectrum sensor may be an amplification gain (e.g., an electronic amplifier gain).

The process 200 includes adjusting 240 a visible spectrum illuminator control parameter based on data associated with the region of interest. For example, an adjusted 240 visible spectrum illuminator control parameter may be a brightness. The brightness of the illuminator may be proportional to power level and/or an illumination level. For example, an adjusted 240 visible spectrum illuminator control parameter is field of illumination. The field of illumination may be adjusted 240 by changing a lens covering the illuminator.

The process 200 includes adjusting 250 a computational control parameter based on data associated with the region of interest. For example, a computational control parameter may specify a resolution at which image data from sensors (e.g., a near infrared sensor or a visible spectrum sensor) will be image processed to extract information relating to the object. For example, a computational control parameter may specify a stride size that will be used by a convolutional layer of convolutional neural network to process image data from sensors (e.g., a near infrared sensor or a visible spectrum sensor) to extract information relating to the object. For example, a computational control parameter may specify a count of pre-processing passes that will be applied to image data from sensors (e.g., a near infrared sensor or a visible spectrum sensor) to extract information relating to the object.

Figure 3A:
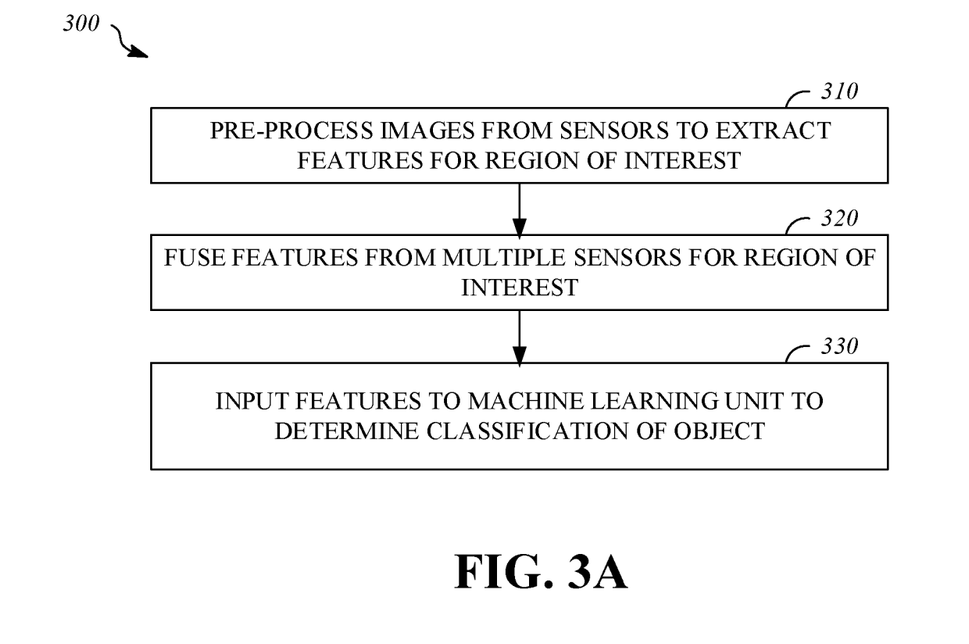
FIG. 3A is a flowchart of an example of a process for determining a classification of an object.
Figure 4:
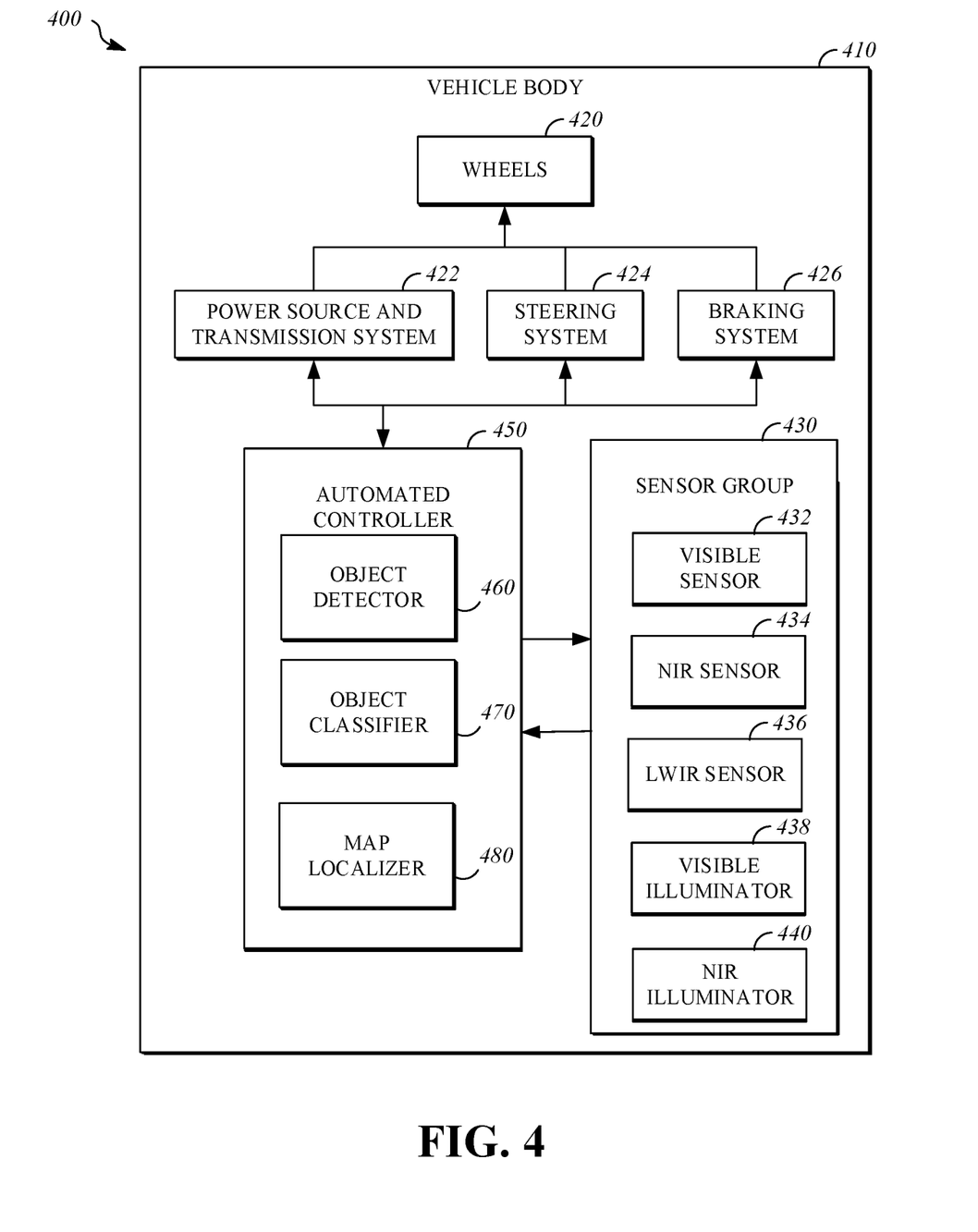
FIG. 4 is a block diagram of an example of a vehicle configured for multi-modal sensing for nighttime autonomous object detection and recognition.

FIG. 3A is a flowchart of an example of a process 300 for determining a classification of an object. The process 300 includes pre-processing 310 images from sensors to extract features for a region of interest; fusing 320 features from multiple sensors for the region of interest; and inputting 330 the features to a machine learning unit to determine a classification of an object appearing in the region of interest. For example, the process 300 may be implemented by the automated controller 450 of FIG. 4. For example, the process 300 may be implemented by the vehicle controller 500 of FIG. 5. For example, the process 300 may be implemented by the computing device 600 of FIG. 6.

The process 300 includes pre-processing 310 images from sensors to extract features for a region of interest. For example, pre-processing 310 a Bayer filtered visible spectrum image may include demosaicing the visible spectrum image. For example, pre-processing 310 a visible spectrum image, a near infrared image, and/or a long wave infrared image may include applying noise reduction filtering (e.g., spatial noise reduction filtering and/or temporal noise reduction filtering). In some implementations, pre-processing 310 an image from one of the sensors includes applying a transformation (e.g., a discrete cosine transform or a wavelet transform) or a matched filter to extract features (e.g., frequency or scale features) from an image portion corresponding to the region of interest. In some implementations, pixel values for an image portion corresponding to the region of interest extracted as features.

The process 300 includes fusing 320 features from multiple sensors for the region of interest. In some implementations, features extracted images captured with different sensors may be resampled to facilitate the fusing of image channels taken from multiple source images (e.g., a visible spectrum image and a near infrared image) at common resolution for analysis with a machine learning unit (e.g., a convolutional neural network).

The process 300 includes inputting 330 the features to a machine learning unit to determine a classification (e.g., as a person, an animal, a vehicle, a barrier, a building, a traffic sign, static, dynamic, etc.) of an object appearing in the region of interest. For example, the machine learning unit may include a convolutional neural network, a support vector machine, or a Bayesian network. For example, the machine learning unit may be trained using the process 350 of FIG. 3B.

Figure 3B:
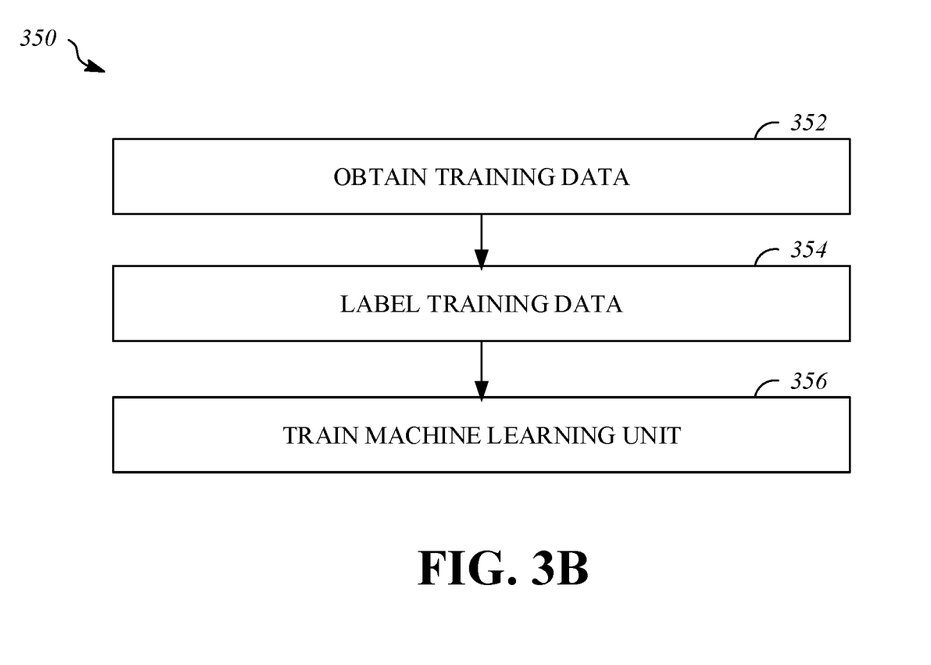
FIG. 3B is a flowchart of an example of a process for training a machine learning unit for classification of objects.

FIG. 3B is a flowchart of an example of a process 350 for training a machine learning unit for classification of objects. The process 350 includes obtaining 352 training data; labeling 354 training data with ground truth labels; and training 356 a machine learning unit using the training data and the ground truth labels. For example, the machine learning unit may be a convolutional neural network and it may be trained 356 using a back-propagation algorithm. For example, the process 350 may be implemented by the automated controller 450 of FIG. 4. For example, the process 350 may be implemented by the vehicle controller 500 of FIG. 5. For example, the process 350 may be implemented by the computing device 600 of FIG. 6.

FIG. 4 is a block diagram of an example of a vehicle configured for multi-modal sensing for nighttime autonomous object detection and recognition. The vehicle 400 includes a vehicle body 410 that contains or is attached to the other systems and components of the vehicle 400. The vehicle 400 includes wheels 420 that are capable of serving as an interface between the vehicle 400 and a road. The wheels 420 provide control surfaces that may be used to guide the vehicle along paths on a road. The vehicle 400 includes actuators operable to cause motion of the vehicle body 410. The actuators include a power and transmission system 422, a steering system 424, and a braking system 426. The vehicle 400 includes a sensor group 430 for sensing an environment near the vehicle 400. The vehicle 400 includes an automated controller 450 configured to maneuver the vehicle, based on sensor data from the sensor group 430, by sending control signals to the actuators (e.g., the power and transmission system 422, the steering system 424, and/or the braking system 426). For example, the vehicle 400 may use the automated controller 450 to implement the process 100 of FIG. 1.

The vehicle 400 includes a power source (e.g., a combustion engine and/or a battery) connected to the wheels via a transmission system 422 capable of spinning the wheels to accelerate the vehicle along a road. The vehicle 400 includes a steering system 424 capable of turning the wheels 420 in relation to the vehicle body 410 to direct the motion of the vehicle, e.g., by controlling the yaw angle and angular velocity or path curvature of the vehicle.

The vehicle 400 includes a sensor group 430, configured to detect other objects near the vehicle. The sensor group 430 may include a variety of sensors including a visible spectrum sensor 432, a near infrared sensor 434, a long wave infrared sensor 436, and/or additional sensors (not shown), such as an accelerometer, a gyroscope, a magnetometer, an odometer, a global positioning system receiver, a lidar sensor, a radar sensor, etc. The sensor group 430 may also include illuminators, such as the visible spectrum illuminator 438 and the near infrared illuminator 440, that provide light that is reflected of objects in the environment to facilitate detection with the corresponding image sensors. The illuminators of the vehicle may be particularly useful when operating at night.

The sensor group 430 includes a visible spectrum sensor 432 (e.g., a camera or an array of cameras) configured to capture visible spectrum images of objects in a space near the vehicle. For example, the visible spectrum sensor 432 may detect electromagnetic radiation in a spectral range that is visible to humans (e.g., wavelengths of 400 nanometers to 700 nanometers). The visible spectrum sensor 432 may capture light in multiple spectral subranges corresponding to different colors (e.g., red, green, and blue) and a visible spectrum image output by the visible spectrum sensor 432 may include multiple color channels (e.g., RGB or YCrCb). The visible spectrum sensor 432 may include a color filter array (e.g., a Bayer filter) for capturing a multi-channel visible spectrum image. In some implementations, the visible spectrum sensor is single channel (e.g., with a single filter for all sensor elements) and outputs black and white images. The visible spectrum sensor 432 may be configured to enhance the quality of a captured image in a region of interest by adjusting one or more control parameters (e.g., integration time, a filter selection, an aperture size selection, and/or a gain) for the visible spectrum sensor. The visible spectrum image may include a field of view (e.g., 120 degrees or 180 degrees). For example, the visible spectrum sensor 432 may provide the visible field of view 720 described in FIG. 7. The visible spectrum image may have a higher resolution than the long wave infrared image and include information about objects in the space out to a short range (e.g., 60 meters) from the visible spectrum sensor. The range may be limited, particularly at night, by the illumination level provided by the visible spectrum illuminator 438.

The sensor group 430 includes a near infrared sensor 434 configured to capture near infrared images of objects in a space near the vehicle. For example, the near infrared sensor 434 may detect electromagnetic radiation in a spectral range just below the visible range (e.g., wavelengths of 0.75 micrometers to 1.4 micrometers). The near infrared sensor 434 may be configured to enhance the quality of a captured image in a region of interest by adjusting one or more control parameters (e.g., integration time, a filter selection, an aperture size selection, and/or a gain) for the near infrared sensor 434. The near infrared sensor 434 may provide a narrow field of view (e.g., 30 degrees). For example, the near infrared sensor 434 may provide the NIR field of view 740 described in FIG. 7. The near infrared image may have a higher resolution than the long wave infrared image and include information about objects in space out to a long range (e.g., 200 meters) from the near infrared sensor. The range may be limited by the illumination level provided by the near infrared illuminator 440.

The sensor group 430 includes a long wave infrared sensor 436 configured to capture long wave infrared images of objects in a space near the vehicle. For example, the long wave infrared sensor 436 may detect electromagnetic radiation in a spectral range corresponding to thermal radiation (e.g., wavelengths of 8 micrometers to 15 micrometers). The long wave infrared sensor 436 may provide a wide field of view (e.g., 180 degrees). For example, the long wave infrared sensor 436 may provide the LWIR field of view 730 described in FIG. 7. A long wave infrared image from the long wave infrared sensor 436 may offer low resolution information about objects in space out to a long range from the sensor.

The sensor group 430 includes a visible spectrum illuminator 438 (e.g., a headlight on a vehicle) configured to project visible light from the vehicle onto objects near the vehicle 400 to facilitate capture of visible spectrum images. The visible spectrum illuminator 438 may include one or more lens that direct light from the visible spectrum illuminator 438 and determine a field of view for the visible spectrum illuminator 438. For example, the visible spectrum illuminator 438 can be used to generate light in this spectral range that is reflected off objects in the space and detected by the visible spectrum sensor 432. A visible spectrum image may be captured using one or more adjusted control parameters (e.g., a power level and/or a field of view) of the visible spectrum illuminator 438. For example, the illumination level for the visible spectrum illuminator 438 may be limited by laws or regulations and/or a power budget for the vehicle 400.

The sensor group 430 includes a near infrared illuminator 440 configured to project near infrared light from the vehicle onto objects near the vehicle 400 to facilitate capture of near infrared images. For example, the infrared illuminator 440 can be used to generate light in this spectral range that is reflected off objects in the space and detected by the near infrared sensor 434. The infrared illuminator 440 may include one or more lens that direct light from the infrared illuminator 440 and determine a field of view for the infrared illuminator 440. A near infrared image may be captured using one or more adjusted control parameters (e.g., a power level and/or a field of view) of the infrared illuminator 440. For example, the illumination level for the infrared illuminator 440 may be limited by laws or regulations and/or a power budget for the vehicle 400.

The vehicle 400 includes an automated controller 450 that is configured to receive data from the sensor group 430 and possibly other sources (e.g., a vehicle passenger/operator control interface) and process the data to implement automated control of the motion of the vehicle 400 by sending control signals to actuators (e.g., the Power source & transmission system 422, the steering system 424, and the braking system 426) that actuate these commands via the wheels 420 to maneuver the vehicle 400. The automated controller 450 may be configured to send control signals to the sensor group 430 and receive sensor data from the sensor group 430. For example, the automated controller 450 may send adjusted control parameters to the sensor group 430 that control the configuration of sensors and/or illuminators for sensor data capture that is tailored to enhance a region of interest associated with a detected object. In some implementations, the automated controller 450 is configured to detect and classify objects at night in a space near the vehicle to inform control of the vehicle 400. For example, the automated controller 450 may be configured to implement process 100 as described in relation to FIG. 1. The automated controller 450 may include specialized data processing and control hardware and/or software running on a data processing apparatus with additional capabilities. For example, the automated controller 450 may be implemented using the vehicle controller 500 of FIG. 5.

The automated controller 450 includes or interfaces with an object detector 460 that is configured to process. For example, the object detector 460 may detect one or more objects by identifying clusters of pixels reflecting thermal radiation from an object (e.g., a person, an animal, or a vehicle) that is greater than its surroundings in the space depicted in a long wave infrared image. For example, one or more objects may be detected in the long wave infrared image using an image segmentation algorithm (e.g., the Felzenszwalb segmentation algorithm) to identify clusters of pixels in the long wave infrared image associated with an object appearing within the field of view of the long wave infrared image. The object detector 460 may include specialized data processing and control hardware and/or software running on a data processing apparatus with additional capabilities.

The automated controller 450 includes or interfaces with an object classifier 470 that is configured to classify objects in a region of interest based on image data from sensors corresponding to the region of interest. The automated controller 450 may pass image data for the region of interest from multiple sensors (e.g., the visible spectrum sensor 432, the near infrared sensor 434, and/or the long wave infrared sensor 436) to the object classifier 470 determine a classification (e.g., as a person, an animal, a vehicle, a barrier, a building, a traffic sign, static, dynamic, etc.) for an object appearing in the region of interest. For example, the object classifier 470 may include a convolutional neural network. In some implementations, a classification of an object is determined using a computational control parameter (e.g., a resolution, a stride, or a count of pre-processing passes) that has been adjusted based on data for the region of interest (e.g., data specifying a location and/or a size of the region of interest). For example, the object classifier 470 may implement the process 300 of FIG. 3A to classify an object. The object classifier 470 may implement the process 350 of FIG. 3B to train a machine learning component of the object classifier 470. The object classifier 470 may include specialized data processing and control hardware and/or software running on a data processing apparatus with additional capabilities.

The automated controller 450 includes or interfaces with a map localizer 480 that is configured to fuse data from multiple sensors of the vehicle 400 and update a navigation map based on local sensor data. In some implementations, the map localizer may implement a bundle adjustment algorithm (e.g., the SLAM algorithm). The automated controller 450 may pass a classification of an object in a region of interest to the map localizer 480 to facilitate updating a navigation map. The map localizer 480 may include specialized data processing and control hardware and/or software running on a data processing apparatus with additional capabilities.

Figure 5:
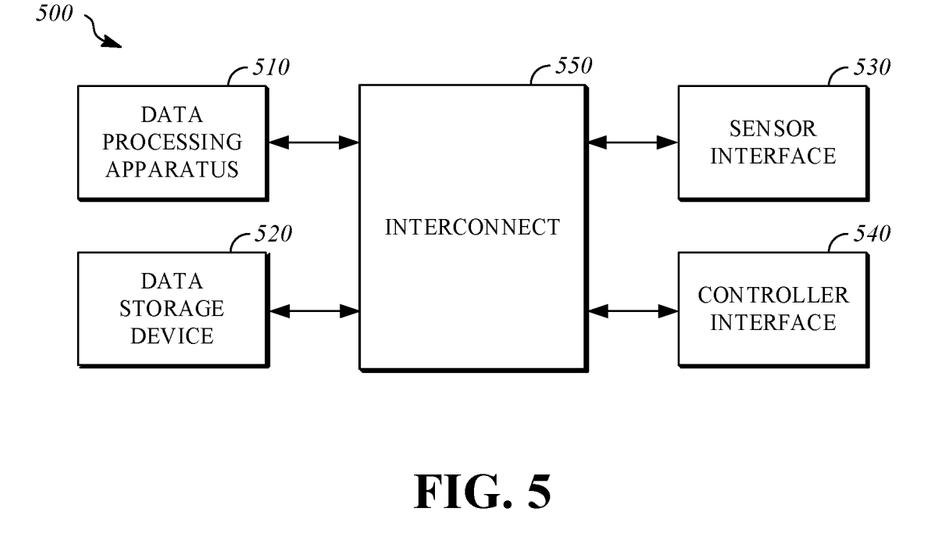
FIG. 5 is a block diagram of an example of a hardware configuration for a vehicle controller.

FIG. 5 is a block diagram of an example of a hardware configuration for a vehicle controller 500. The hardware configuration may include a data processing apparatus 510, a data storage device 520, a sensor interface 530, a controller interface 540, and an interconnect 550 through which the data processing apparatus 510 may access the other components. For example, the vehicle controller 500 may be configured to implement the process 100 of FIG. 1.

The data processing apparatus 510 is operable to execute instructions that have been stored in a data storage device 520. In some implementations, the data processing apparatus 510 is a processor with random access memory for temporarily storing instructions read from the data storage device 520 while the instructions are being executed. The data processing apparatus 510 may include single or multiple processors each having single or multiple processing cores. Alternatively, the data processing apparatus 510 may include another type of device, or multiple devices, capable of manipulating or processing data. For example, the data storage device 520 may be a non-volatile information storage device such as a hard drive, a solid-state drive, a read-only memory device (ROM), an optical disc, a magnetic disc, or any other suitable type of storage device such as a non-transitory computer readable memory. The data storage device 520 may include another type of device, or multiple devices, capable of storing data for retrieval or processing by the data processing apparatus 510. For example, the data storage device 520 can be distributed across multiple machines or devices such as network-based memory or memory in multiple machines performing operations that can be described herein as being performed using a single computing device for ease of explanation. The data processing apparatus 510 may access and manipulate data in stored in the data storage device 520 via interconnect 550. For example, the data storage device 520 may store instructions executable by the data processing apparatus 510 that upon execution by the data processing apparatus 510 cause the data processing apparatus 510 to perform operations (e.g., operations that implement the process 100 of FIG. 1).

The sensor interface 530 may be configured to control and/or receive image data (e.g., a long wave infrared image, a near infrared image, and/or a visible spectrum image) from one or more sensors (e.g., the visible spectrum sensor 432, the near infrared sensor 434, and/or the long wave infrared sensor 436). In some implementations, the sensor interface 530 may implement a serial port protocol (e.g., I2C or SPI) for communications with one or more sensor devices over conductors. In some implementations, the sensor interface 530 may include a wireless interface for communicating with one or more sensor groups via low-power, short-range communications (e.g., using a vehicle area network protocol).

The controller interface 540 allows input and output of information to other systems within a vehicle to facilitate automated control of the vehicle. For example, the controller interface 540 may include serial ports (e.g., RS-232 or USB) used to issue control signals to actuators in the vehicle (e.g., the power source and transmission system 422, the steering system 424, and the braking system 426) and to receive sensor data from a sensor group (e.g., the sensor group 430. For example, the interconnect 550 may be a system bus, or a wired or wireless network (e.g., a vehicle area network).

Figure 6:
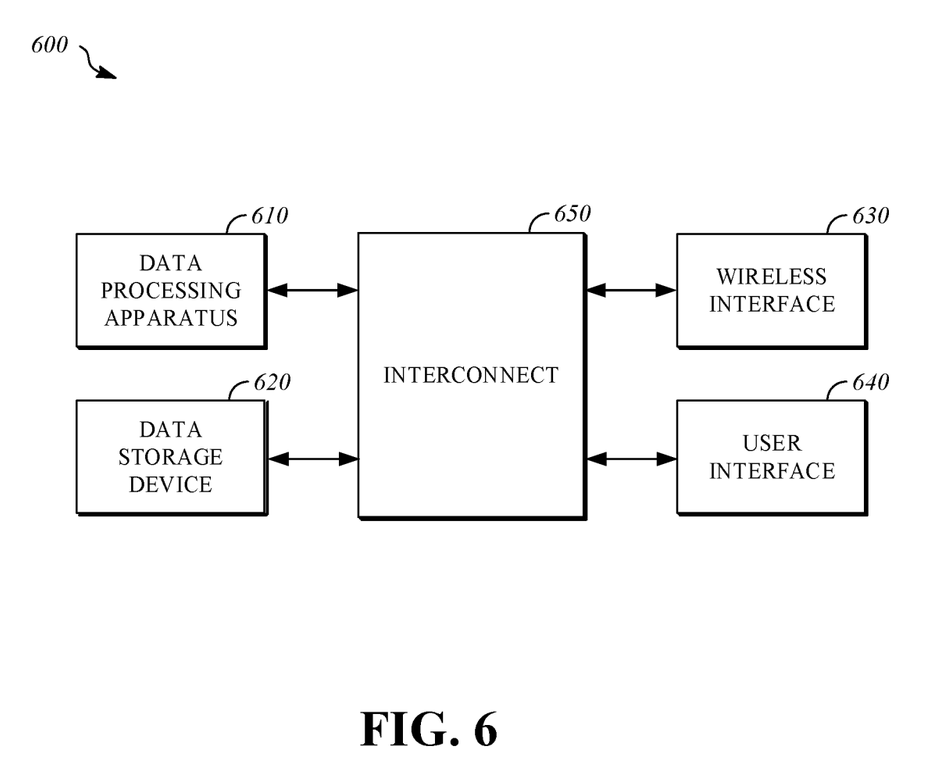
FIG. 6 is a block diagram of an example of a hardware configuration of a computing device.

FIG. 6 is a block diagram of an example of a hardware configuration of a computing device 600. The hardware configuration may include a data processing apparatus 610, a data storage device 620, wireless interface 630, a user interface 640, and an interconnect 650 through which the data processing apparatus 610 may access the other components. The computing device may be configured to detect and classify objects at night based on image data from multiple sensors. For example, the computing device 600 may be configured to implement the process 100 of FIG. 1.

The data processing apparatus 610 is operable to execute instructions that have been stored in a data storage device 620. In some implementations, the data processing apparatus 610 is a processor with random access memory for temporarily storing instructions read from the data storage device 620 while the instructions are being executed. The data processing apparatus 610 may include single or multiple processors each having single or multiple processing cores. Alternatively, the data processing apparatus 610 may include another type of device, or multiple devices, capable of manipulating or processing data. For example, the data storage device 620 may be a non-volatile information storage device such as a hard drive, a solid-state drive, a read-only memory device (ROM), an optical disc, a magnetic disc, or any other suitable type of storage device such as a non-transitory computer readable memory. The data storage device 620 may include another type of device, or multiple devices, capable of storing data for retrieval or processing by the data processing apparatus 610. For example, the data storage device 620 can be distributed across multiple machines or devices such as network-based memory or memory in multiple machines performing operations that can be described herein as being performed using a single computing device for ease of explanation. The data processing apparatus 610 may access and manipulate data in stored in the data storage device 620 via interconnect 650. For example, the data storage device 620 may store instructions executable by the data processing apparatus 610 that upon execution by the data processing apparatus 610 cause the data processing apparatus 610 to perform operations (e.g., operations that implement the process 100 of FIG. 1).

The wireless interface 630 facilitates communication with other devices, for example, a vehicle (e.g., the vehicle 400). For example, wireless interface 630 may facilitate communication via a vehicle Wi-Fi network with a vehicle controller (e.g., the vehicle controller 500 of FIG. 5). For example, wireless interface 630 may facilitate communication via a WiMAX network with a vehicle at a remote location.

The user interface 640 allows input and output of information from/to a user. In some implementations, the user interface 640 can include a display, which can be a liquid crystal display (LCD), a cathode-ray tube (CRT), a light emitting diode (LED) display (e.g., an OLED display), or other suitable display. For example, the user interface 640 may include a touchscreen. For example, the user interface 640 may include a head-mounted display (e.g., virtual reality goggles or augmented reality glasses). For example, the user interface 640 may include a positional input device, such as a mouse, touchpad, touchscreen, or the like; a keyboard; or other suitable human or machine interface devices. For example, the interconnect 650 may be a system bus, or a wired or wireless network (e.g., a vehicle area network).

Figure 7:
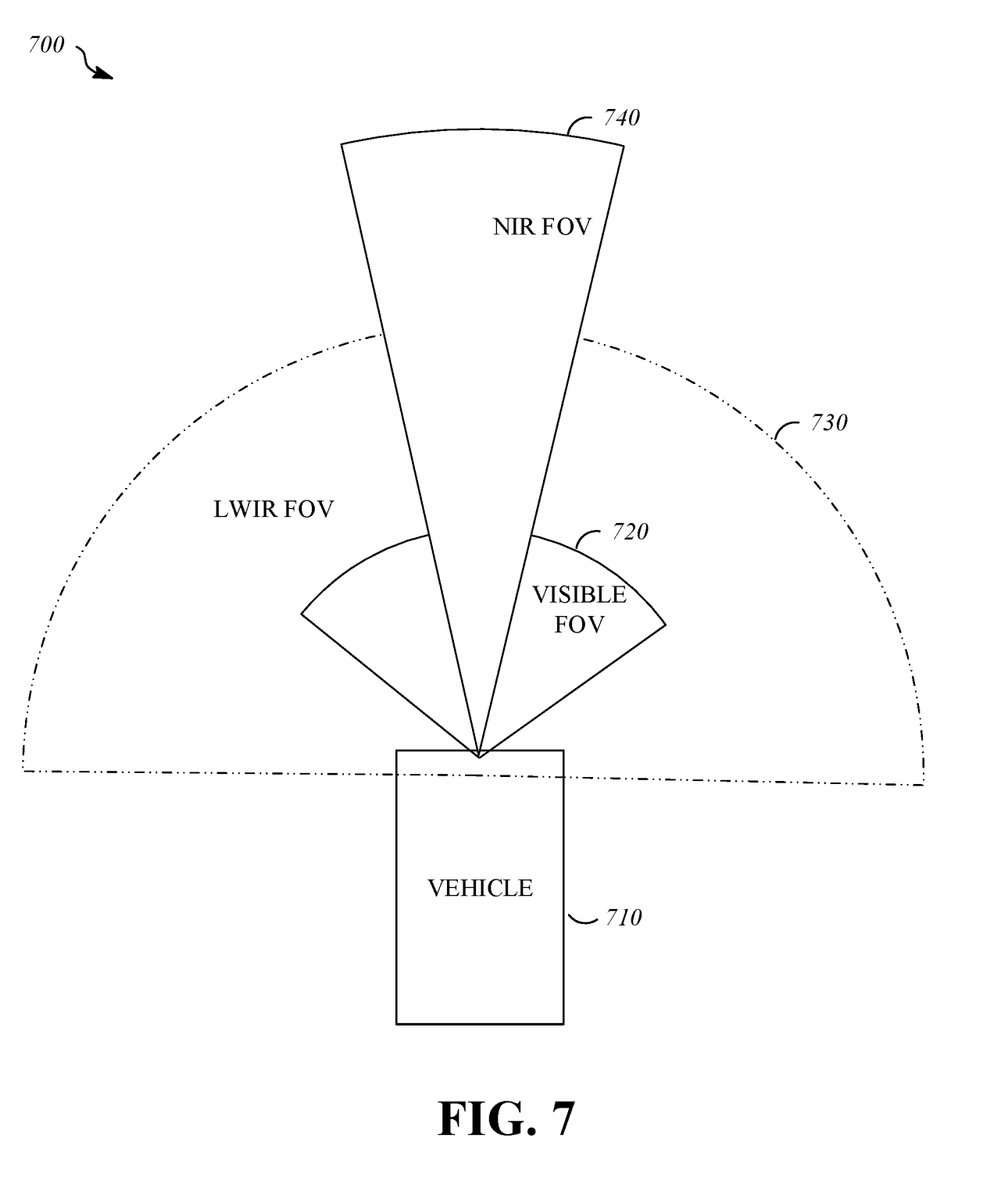
FIG. 7 is a diagram of an example of overlapping fields of view for multiple sensors of different types mounted on a vehicle.

FIG. 7 is a diagram of an example of overlapping fields of view 700 for multiple sensors of different types mounted on a vehicle 710. The vehicle 710 includes a visible spectrum sensor and a visible spectrum illuminator that together provide a corresponding visible field of view 720 that spans about 120 degrees and extends 60 meters in front of the vehicle. The visible spectrum images from this visible spectrum sensor may include three color channels (e.g., red, green, and blue). The range of the visible spectrum illuminator and sensor may be limited by laws and regulations intended to prevent blinding oncoming traffic and light pollution. Thus, the visible spectrum sensor may provide high resolution color images at relatively short range.

The vehicle 710 includes a long wave infrared sensor that provides a corresponding LWIR field of view 730 that spans 180 degrees with an effective range (at reasonable resolution) that extends 120 meters in front of the vehicle. Thus, the long wave infrared sensor may provide low resolution images at relatively moderate to long range.

The vehicle 710 includes a near infrared sensor and a near infrared illuminator that together provide a corresponding NIR field of view 740 that spans about 30 degrees and extends 200 meters in front of the vehicle. Thus, the near infrared sensor may provide high resolution monochromatic images at relatively long range.

These overlapping fields of view 700 may provide complimentary information that can be used to facilitate robust detection and classification of objects at night and in low ambient light environments. For example, low resolution information from a long wave infrared image may be used to detect objects and direct illumination (e.g., near infrared and/or visible spectrum light) and focus image processing resources of higher resolution modalities at the detected object to facilitate classification of the object.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system, comprising:
a long wave infrared sensor;
a near infrared sensor;
a visible spectrum sensor;
a data processing apparatus; and
a data storage device storing instructions executable by the data processing apparatus that upon execution by the data processing apparatus cause the data processing apparatus to perform operations comprising:
obtaining a long wave infrared image from the long wave infrared sensor,
detecting an object in the long wave infrared image,
identifying a region of interest associated with the object,
adjusting a control parameter of the near infrared sensor based on data associated with the region of interest,
adjusting a control parameter of the visible spectrum sensor based on data associated with the region of interest,
obtaining a near infrared image captured using the adjusted control parameter of the near infrared sensor,
obtaining a visible spectrum image from the visible spectrum sensor that is captured using the adjusted control parameter of the visible spectrum sensor, and
determining a classification of the object based on data of the near infrared image associated with the region of interest and based on data of the visible spectrum image associated with the region of interest.

2. The system of claim 1, further comprising:
a near infrared illuminator;
wherein the operations comprise adjusting a near infrared illuminator control parameter based on data associated with the region of interest; and
wherein the near infrared image is captured using the adjusted near infrared illuminator control parameter.

3. The system of claim 2, wherein the near infrared illuminator control parameter is a brightness.

4. The system of claim 2, wherein the near infrared illuminator control parameter is field of illumination.

5. The system of claim 1, wherein the control parameter of the near infrared sensor is an integration time.

6. The system of claim 1, wherein the control parameter of the near infrared sensor is an aperture size.

7. The system of claim 1, wherein the control parameter of the near infrared sensor is a filter selection.

8. The system of claim 1, wherein the control parameter of the near infrared sensor is an amplification gain.

9. The system of claim 1, further comprising:
a visible spectrum illuminator;
wherein the operations comprise adjusting a visible spectrum illuminator control parameter based on data associated with the region of interest; and
wherein the visible spectrum image is captured using the adjusted visible spectrum illuminator control parameter.

10. The system of claim 1, wherein the operations further comprise:
adjusting a computational control parameter based on data associated with the region of interest; and
wherein the classification of the object is determined using the computational control parameter.

11. A method, comprising:
obtaining a long wave infrared image from a long wave infrared sensor;
detecting an object in the long wave infrared image;
identifying a region of interest associated with the object;
adjusting a control parameter of a near infrared sensor based on data associated with the region of interest;
adjusting a visible spectrum sensor control parameter based on data associated with the region of interest;
obtaining a near infrared image captured using the adjusted control parameter of the near infrared sensor;
obtaining a visible spectrum image from the visible spectrum sensor that is captured using the adjusted control parameter of the visible spectrum sensor; and
determining a classification of the object based on data of the near infrared image associated with the region of interest and based on data of the visible spectrum image associated with the region of interest.

12. The method of claim 11, further comprising:
adjusting a visible spectrum illuminator control parameter based on data associated with the region of interest; and
wherein the visible spectrum image is captured using the adjusted visible spectrum illuminator control parameter.

13. The method of claim 11, further comprising:
adjusting a near infrared illuminator control parameter based on data associated with the region of interest; and
wherein the near infrared image is captured using the adjusted near infrared illuminator control parameter.

14. The method of claim 11, wherein the near infrared image has a higher resolution than the long wave infrared image.

15. The method of claim 11, further comprising:
adjusting a computational control parameter based on data associated with the region of interest; and
wherein the classification of the object is determined using the computational control parameter.

16. A vehicle, comprising:
a vehicle body;
actuators operable to cause motion of the vehicle body;
a long wave infrared sensor;
a near infrared sensor;
a visible spectrum sensor; and
an automated controller configured to:
obtain a long wave infrared image from the long wave infrared sensor,
detect an object in the long wave infrared image,
identify a region of interest associated with the object,
adjust a control parameter of the near infrared sensor based on data associated with the region of interest,
adjust a control parameter of the visible spectrum sensor based on data associated with the region of interest,
obtain a near infrared image captured using the adjusted control parameter of the near infrared sensor,
obtain a visible spectrum image from the visible spectrum sensor that is captured using the adjusted control parameter of the visible spectrum sensor,
determine a classification of the object based on data of the near infrared image associated with the region of interest and based on data of the visible spectrum image associated with the region of interest,
determine a motion plan based on the classification of the object, and
output commands to the actuators to maneuver the vehicle.

17. The vehicle of claim 16, further comprising:
a visible spectrum illuminator;
wherein the automated controller is configured to adjust a visible spectrum illuminator control parameter based on data associated with the region of interest; and
wherein the visible spectrum image is captured using the adjusted visible spectrum illuminator control parameter.

18. The vehicle of claim 16, further comprising:
a near infrared illuminator;

wherein the automated controller is configured to adjust a near infrared illuminator control parameter based on data associated with the region of interest; and wherein the near infrared image is captured using the adjusted near infrared illuminator control parameter.

19. The vehicle of claim 16, wherein the near infrared image has a higher resolution than the long wave infrared image.

20. The vehicle of claim 16, wherein the automated controller is further configured to:

adjust a computational control parameter based on data associated with the region of interest; and wherein the classification of the object is determined using the computational control parameter.

* * * * *